US009553846B2

(12) United States Patent
Gu

(10) Patent No.: US 9,553,846 B2
(45) Date of Patent: Jan. 24, 2017

(54) METHOD AND SYSTEM FOR REALIZING VIRTUAL NETWORK

(71) Applicant: ZTE Corporation, Shenzhen, Guangdong (CN)

(72) Inventor: Zhongyu Gu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 46 days.

(21) Appl. No.: 14/395,512

(22) PCT Filed: Apr. 10, 2013

(86) PCT No.: PCT/CN2013/074035
§ 371 (c)(1),
(2) Date: Nov. 25, 2014

(87) PCT Pub. No.: WO2013/155943
PCT Pub. Date: Oct. 24, 2013

(65) Prior Publication Data
US 2015/0082418 A1 Mar. 19, 2015

(30) Foreign Application Priority Data

Apr. 20, 2012 (CN) .......................... 2012 1 0118766

(51) Int. Cl.
*H04L 29/06* (2006.01)
*H04L 12/46* (2006.01)
(52) U.S. Cl.
CPC ....... *H04L 63/0272* (2013.01); *H04L 12/4633* (2013.01); *H04L 63/029* (2013.01); *H04L 12/4641* (2013.01)
(58) Field of Classification Search
CPC ....... H04L 12/4641–12/4695; H04L 29/12028; H04L 41/12; H04L 45/02–45/028; H04L 45/586; H04L 63/0272; H04L 63/029
See application file for complete search history.

(56) References Cited

U.S. PATENT DOCUMENTS 6,675,208 B1  1/2004  Rai
8,213,429 B2  7/2012  Wray
(Continued)

FOREIGN PATENT DOCUMENTS

CN    101453409 A    6/2009

OTHER PUBLICATIONS

[RFC2131] R. Droms. "Dynamic Host Configuration Protocol". Network Working Group. Request for Comments: 2131. Published: Mar. 1997.*

(Continued)

*Primary Examiner* — Linglan Edwards
*Assistant Examiner* — Kevin Bechtel
(74) *Attorney, Agent, or Firm* — Oppedahl Patent Law Firm LLC

(57) ABSTRACT

A virtual network (VN) realization method and system are provided. The method includes setting a VN-AP in a data center network and/or a broadband network. A service deployment and management function entity receives a VN service request from a user to generate feature information of the VN; a PC/VM automatically discovers the VN-AP, the automatically discovered VN-AP generates the VN forwarding table entry of the PC/VM after the PC/VM passes the identity authentication of the VN, and performs tunnel encapsulation according to the VN forwarding table entry to forward a packet from the PC/VM. By discovering a VN-AP for processing a VN automatically, the disclosure realizes the automatic and rapid deployment of the VN.

14 Claims, 6 Drawing Sheets

(56) References Cited

U.S. PATENT DOCUMENTS

| | | | |
|---|---|---|---|
| 8,223,770 B2 | 7/2012 | Wray | |
| 8,274,912 B2 | 9/2012 | Wray | |
| 8,407,366 B2 | 3/2013 | Alkhatib | |
| 2007/0280243 A1 | 12/2007 | Wray | |
| 2008/0212598 A1* | 9/2008 | Kolli | H04L 12/2856 370/409 |
| 2008/0225875 A1 | 9/2008 | Wray | |
| 2009/0129385 A1 | 5/2009 | Wray | |
| 2011/0032843 A1* | 2/2011 | Papp | H04L 12/4666 370/254 |
| 2011/0283017 A1 | 11/2011 | Alkhatib | |
| 2012/0014386 A1 | 1/2012 | Xiong | |
| 2012/0054367 A1* | 3/2012 | Ramakrishnan | G06F 9/4856 709/242 |
| 2012/0311154 A1* | 12/2012 | Morgan | G06F 9/5072 709/226 |
| 2013/0086236 A1* | 4/2013 | Baucke | H04L 45/50 709/223 |
| 2013/0148511 A1* | 6/2013 | Banga | H04L 41/082 370/250 |

OTHER PUBLICATIONS

International Search Report in international application No. PCT/CN2013/074035, mailed on Jul. 11, 2013.
English Translation of the Written Opinion of the International Search Authority in international application No. PCT/CN2013/074035, mailed on Jul. 11, 2013.
Supplementary European Search Report in European application No. 13777624.1, mailed on Mar. 26, 2015.

\* cited by examiner

METHOD AND SYSTEM FOR REALIZING VIRTUAL NETWORK

TECHNICAL FIELD

The disclosure relates to the field of broadband communications and more particularly to a method and system for realizing a Virtual Network (VN).

BACKGROUND

Cloud computing has become a hotspot in information industry in recent years. In the general background of cloud computing, Software-as-a-Service (SaaS), Infrastructure-as-a-Service (Iaas) and Platform-as-a-Service (PaaS) have become hotspot services, and there is a trend towards Everything-as-a-Service (XaaS). Under the influence of the thought of XaaS and in the light of the development thought of electric systems (users use power only but not construct their own power plants for power supply), Network-as-a-Service (NaaS) may be provided for small and medium-sized enterprises or even for large-scale enterprises, that is, the network of each enterprise user is provided by a service provider, rather than that the service provider provides Internet network connection for the enterprise user network and the user himself constructs his own internal network/Intranet, the IT system and other related service systems. In this way, on one hand, new business growth can be brought for the service providers, and on the other hand, for enterprise users, especially for small and medium-sized enterprise users, benefits are gained such as the achievement of a standard network security and obtaining of the network at less expenditure.

Further, with the deployment of IaaS, network services need to be provided for a great number of users in a data center network, that is, it is needed to provide separated networks for a great many users in a data center network. Under the current technical conditions, the networks are separated via a Virtual Local Area Network (VLAN) or a Layer 3/Layer 2 Virtual Private Network (L3/L2 VPN).

However, as most of existing data center networks have a big L2 access network and related L3 networks, an L3/L2 VPN is not much applicable mainly for the sake of the necessity to deploy new network function entities (PE) in the network, and as the number of VLANs is limited not more than 4096, generally, VLAN cannot meet the demand for service provision by a large data center. Thus, at present, based on an idea of constructing and isolating virtual networks using different tunnel technologies on the existing networks, virtual networks of a data center are realized by overlay networks, which, meanwhile, addresses the problem of extendibility. Specifically, as shown in FIG. 1, in a data center network, overlaid tunnels are encapsulated by introducing End Point of Virtual Tunnel (VTEP), thereby realizing virtual networks for a plurality of users (that is, a plurality of tenants). The typical technologies used include Virtual Extensible Local Area Network (VXLAN), Network Virtualization Using Generic Routing Encapsulation (NVGRE) and so on. In view of the realization of Network-as-a Service, the connection condition between an L2 network and an L3 network should be paid attention to, and the description is given here based on the technical background of VXLAN. That is, a tunnel technology is introduced into an L3 network to encapsulate, transmit and connect an L2 network via the L3 network, specifically, VTEP may be a Hypervisor, an access switch or a router, wherein the Hypervisor may specifically be a software system supporting the running of a virtual machine on a physical computer.

The specific realization flow of a virtual network, as shown in FIG. 2, includes: connecting a Virtual Machine (VM) with an access switch via a vSwitch in a Hypervisor, that is, connecting the VM with the access switch via a vNIC and a vSwitch. To separate traffics of different VMs in the same physical machine, a VLAN technology is needed if the VMs belong to different user networks. As shown in FIG. 2, Personal Computers may not be virtualized as VMs, but directly access/constitute a VN instead.

Step 201: VMs are connected with a VTEP and allocated to different VNs.

In this step, different VNs are identified by network names, wherein the network names are employed for being used by operators easily and identifying VNs conveniently, further, the network names can be mapped to network identifiers for network transmission, and usually, the identifiers use a 24-bit field, that is, up to 16 million VN can be identified. It should be appreciated that the field of other bits, for example, 32 bits, can be used to provide a wider virtual network range.

Step 202: The VTEP generates corresponding VN forwarding table entry for a specific VM;

specifically, the VTEP acquires the correspondence relationship between the Medium/Media Access Control (MAC) address and/or Internet Protocol (IP) address of the VM and the IP address of the VTEP according to preset information and generates a VN forwarding table.

Step 203: The VTEP may send the correspondence relationship between the VM MAC and the IP address of the VTEP to all related VTEPs in the virtual network via MP-BGP or extended protocols of MP-BGP;

here, the VN forwarding tables also may be synchronized using an approach similar to the conventional learning mechanism of the data plane of an Ethernet switch, without using MP-BGP.

Step 204: All the related VTEPs generate corresponding VN forwarding table entry for the specific VM.

Step 205: When there is a packet needing to be forwarded, the VTEP looks up the VN forwarding table for the entry corresponding to the VM for information such as the destination address of the message and performs tunnel encapsulation;

specifically, the VTEP looks up the VN forwarding table entry corresponding to the VM for the destination IP address and the MAC address of the correspondent VTEP according to the destination address of the packet and performs tunnel encapsulation, that is, performs IP encapsulation on an L2 packet/frame, and forwards the encapsulated packet via an L3 network.

It should be further noted that as the VTEP may be in the L2 network, L2 encapsulation may be further performed for the encapsulated IP packet.

Step 206: The VTEP sends the packet to the correspondent VTEP.

Step 207: After receiving the related virtual network encapsulated packet, the correspondent VTEP decapsulates the received packet to obtain the L2 packet and forwards the L2 packet to the correspondent PC/VM;

it should be appreciated that the returning of a packet from the correspondent PC/VM is similar to the foregoing flow and is therefore not described here repeatedly.

The foregoing flow is similar to the conventional network service deployment of a Multi-Protocol Label Switching (MPLS) Virtual Private Network (VPN). From the point of view of protocol, with a manually configured VTEP in combination with the protocols used between VTEPs or a learning mechanism of a data plane, a service can be deployed. However, it is a huge amount of work to manually configure VNs when there is a great many of PC servers, for example, when there is a data center which has hundreds of thousands of computers each of which further may create dozens of virtual machines; furthermore, the dynamic joining or departing of a VM to or from a VN complicates the service deployment of the VN.

SUMMARY

In view of this, it is a main object of the disclosure to provide a method and system for realizing a virtual network, which are capable of deploying a virtual network automatically and rapidly.

To this end, the technical solutions of the disclosure are implemented as follows.

A method for realizing a VN includes that a VN-AP is set in a data center network and/or a broadband network;

a service deployment and management function entity receives a VN service request from a user to generate feature information of the VN;

a PC/VM discovers the VN-AP automatically, and after the PC/VM passes the VN's identity authentication, the automatically discovered VN-AP generates the VN forwarding table entry of the PC/VM and performs tunnel encapsulation according to the VN forwarding table entry to forward a packet from the PC/VM.

The automatic discovery of the VN-AP by the PC/VM may be as follows:

the PC/VM sends a VN-AP discovery message via an Ethernet frame of a specific type;

all the VN-APs in the broadcast domain of the PC/VM return a VN-AP offer message to the PC/VM;

the PC/VM selects one VN-AP from all the VN-APs which returned the VN-AP offer message and sends a VN-AP request message to the selected VN-AP; and the VN-AP returns an acknowledgement/response message to the PC/VM.

The acknowledgement/response message may include VLAN identifier information or session identifier information used by the VN-AP and the PC/VM to separate the PC/VM from other PCs/VMs.

The feature information of the VN may include one or more of the following information: VN name, VN-ID of the VN, the MAC address of a PC/VM which can be connected with the VN, and the user name and user password for authenticating the VN's identity of the PC/VM.

Accordingly, the method further may include:

storing the feature information of the VN in the service deployment and management function entity and/or an Authenticating, Authorizing and Accounting (AAA) server.

The PC/VM passing the VN's identity authentication may refer to that:

the VN's identify of the PC/VM is authenticated through Point to Point Protocol over Ethernet (PPPoE) or 802.1x protocol, and after the PC/VM passes the VN's identity authentication, the AAA server or the service deployment and management function entity returns a VN-ID to the VN-AP.

The method further may include:

the service deployment and management function entity and/or the AAA server collect/collects relevant information of the VN which includes one or more of following information: the number of the PCs/VMs actually connected within the VN, the starting time and the ending time of the connection of the PCs/VMs or the duration of the connection.

The generation of the entry of the VN forwarding table of the PC/VM by the automatically discovered VN-AP may be as follows:

when the PC/VM is the first VN access point in the broadcast domain or information of the VN is absent in the VN-AP, the VN forwarding table and the entry of the VN forwarding table are generated, otherwise, the VN forwarding table entry of the PC/VM of the VN forwarding table are generated.

The method further may include that:

the VN-AP performs information interaction with all other VN-APs of the VN in the data center network and/or the broadband network to synchronize the VN forwarding tables.

Synchronizing the VN forwarding tables refers to:

realizing the synchronization of VN forwarding tables of all VN-APs of the VN through MP-BGP or extended MP-BGP, or a learning mechanism of a data plane.

Performing tunnel encapsulation may refer to:

performing tunnel encapsulation using one or more message headers including VN-ID information.

The method further may include:

charging the user of the VN according to the resource usage information of the VN, wherein the resource usage information of the VN includes the number of the PCs/VMs actually connected within the VN, the duration of the connection and a charging strategy.

A system for realizing a virtual network (VN) includes a service deployment and management function entity, a PC/VM and a VN-AP, wherein the service deployment and management function entity receives a VN service request from a user to generate feature information of the VN;

the PC/VM automatically discovers the VN-AP which is set in a data center network and/or a broadband network or is connected with the VN according to presetting of a VN-AP; and the VN-AP authenticates the VN's identity of the PC/VM, generates a VN forwarding table entry of the PC/VM after the PC/VM passes the VN's identity authentication, and performs tunnel encapsulation according to the VN forwarding table entry to forward a packet from the PC/VM.

The PC/VM may send a VN-AP discovery message via an Ethernet frame of a specific type and selects one VN-AP according to the returned VN-AP offer message to send a VN-AP request message to the selected VN-AP.

The VN-AP returns a VN-AP offer message to the PC/VM according to the VN-AP discovery message and returns an acknowledgement/response message to the PC/VM after receiving the VN-AP request message, wherein the acknowledgement/response message includes VLAN identifier information or session identifier information used by the VN-AP and the PC/VM to separate the PC/VM from other PCs/VMs.

The system further may include an AAA server, wherein the VN's identity of the PC/VM is authenticated via PPPoE or 802.1x protocols;

the AAA server and/or the service deployment and management function entity store/stores the feature information of the VN and return/returns a VN-ID to the VN-AP after the PC/VM passes the VN's identity authentication.

The service deployment and management function entity and/or the AAA server collect/collects relevant information of the VN which includes one or more: the number of the PCs/VMs actually connected within the VN, the starting time and the ending time of the connection of the PCs/VMs or the duration of the connection.

When the PC/VM is the first VN access point in a broadcast domain or information of the VN is absent in the VN-AP, the VN-AP generates the VN forwarding table and the VN forwarding table entry, otherwise, the VN-AP generates the VN forwarding table entry of the PC/VM of the VN forwarding table.

Further, the VN-AP performs information interaction with all other VN-APs of the VN in the data center network and/or the broadband network to synchronize the VN forwarding tables.

The VN-AP synchronizes VN forwarding tables of all VN-APs of the VN through MP-BGP or extended MP-BGP or the learning mechanism of a data plane.

The VN-AP performs tunnel encapsulation using one or more message headers including VN-ID information.

Further, the service deployment and management function entity or the AAA server charges the user of the VN according to the resource usage information of the VN which includes the number of the PCs/VMs actually connected within the VN, the duration of the connection and a charging strategy.

By automatically discovering a VN-AP for processing a VN, the disclosure realizes the automatic and rapid deployment of the VN at a reduced cost, moreover, the disclosure is applicable to both an ordinary broadband network and a data center network and is therefore extended to a broader application range.

DETAILED DESCRIPTION

The disclosure provides an implementation scheme of deploying a network as a service. Moreover, as a data center network is generally centralized in the machine room(s) of a data center of a service provider which is far from ordinary users, it is necessary to connect a client with a data center so that a virtual network is more widely applicable; this is usually achieved by a broadband network.

The basic idea of the disclosure lies in that one or more VN access points (VN-AP) is or are set in a data center network and/or a broadband network; a service deployment and management function entity receives a VN service request from a user and generates feature information of the VN; a PC/VM discovers the VN-AP automatically, and after the PC/VM passes the VN's identity authentication, the automatically discovered VN-AP generates the VN forwarding table entry of the PC/VM and performs tunnel encapsulation according to the VN forwarding table entry to forward a packet from the PC/VM.

The object, the technical scheme and the advantages of the disclosure will be more readily apparent from the following detailed description of embodiments when read in conjunction with the accompanying drawings.

Figure 1:
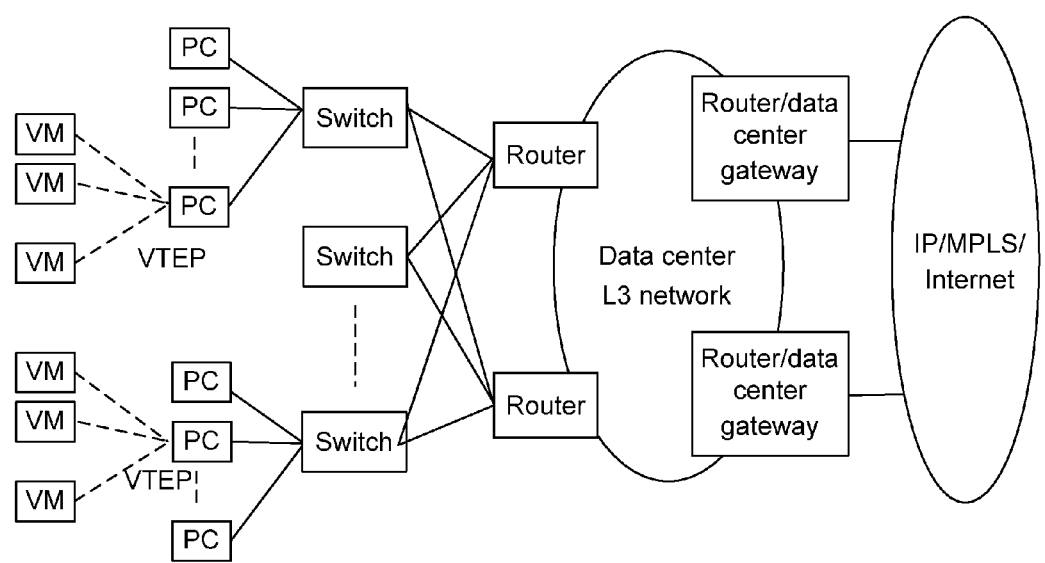
FIG. 1 is a schematic diagram illustrating a network structure realized by existing overlay virtual network.
Figure 2:
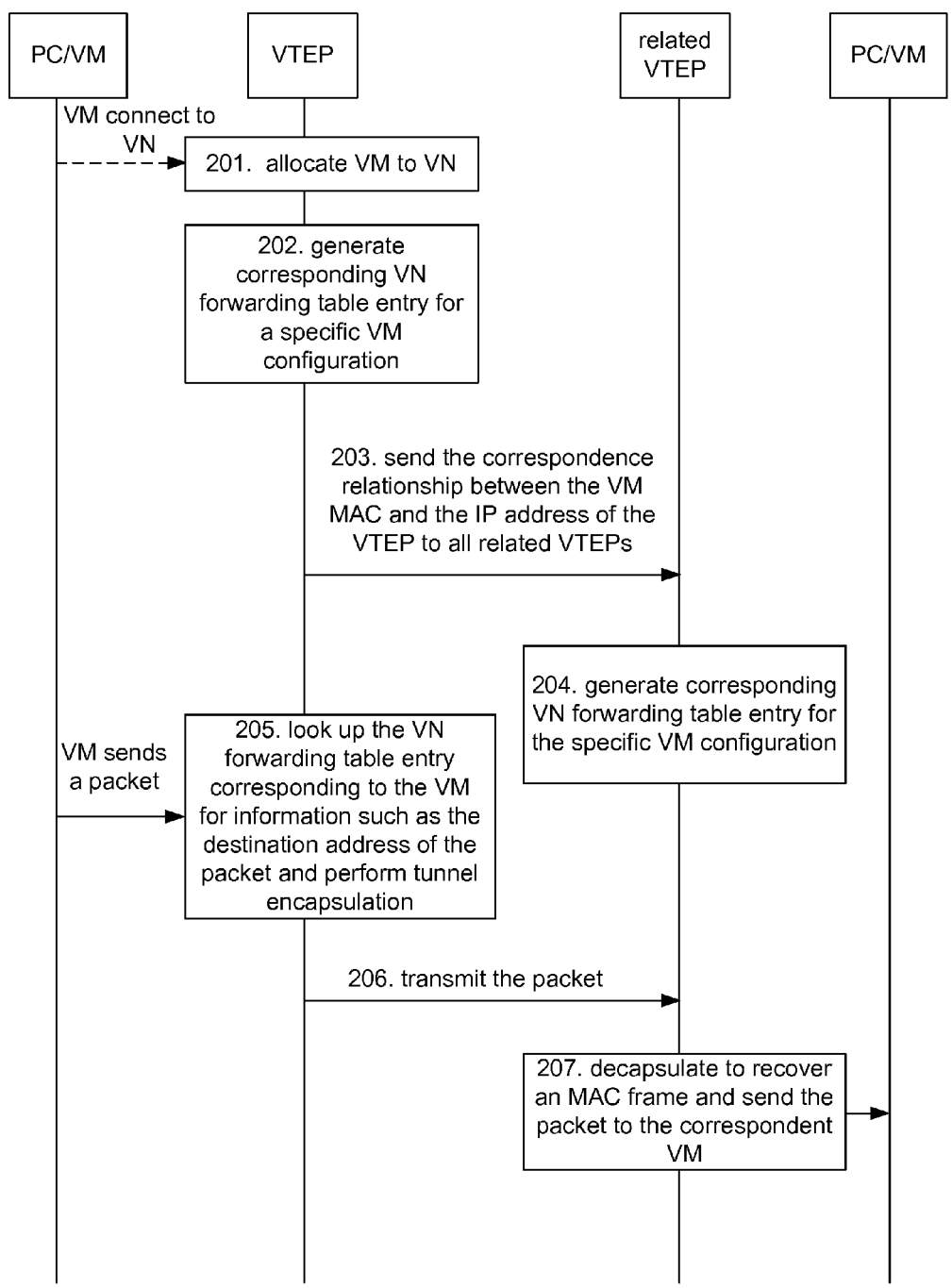
FIG. 2 is a flowchart schematically illustrating the realization of existing overlay virtual network.
Figure 3:
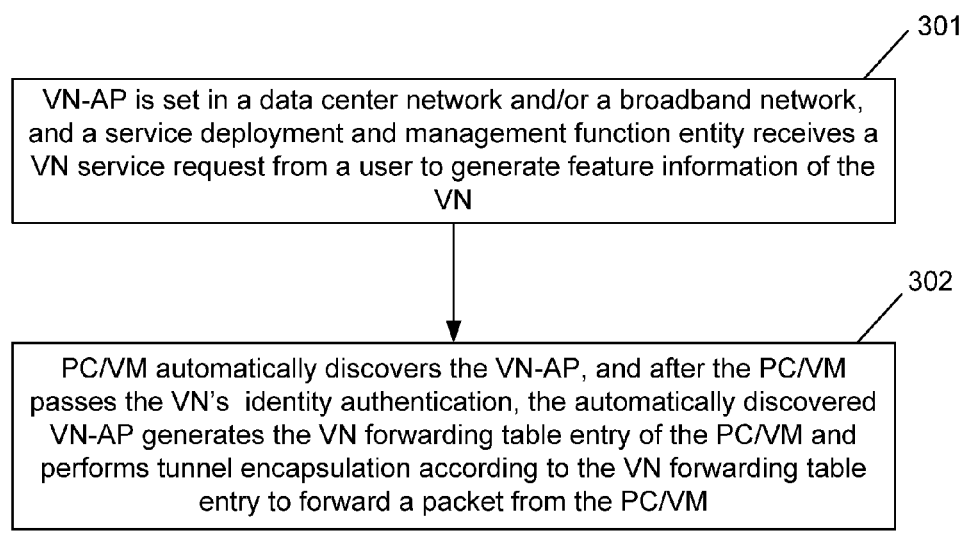
FIG. 3 is a flowchart schematically illustrating a VN realization method according to the disclosure.

FIG. 3 shows a flow of a virtual network realization method provided herein, and as shown in FIG. 3, the method includes the following steps.

Step 301: A VN-AP is set in a data center network and/or a broadband network, and a service deployment and management function entity receives a VN service request from a user to generate feature information of the VN;

the feature information of the VN includes one or more of the following information: the VN name, VN identifier (VN-ID) of the VN, the MAC address of a PC/VM which can be connected with the VN, and the user name and user password for authenticating the VN's identity of the PC/VM. Here, the feature information of the VN may be stored in the service deployment and management function entity and/or an Authentication Authorization &Accounting (AAA) server; it should be noted that the functions of the AAA server may be set in the service development and management functional entity according to the demand for service deployment, or using the existing AAA server. The specific implementation is carried out according to the specific network condition for service deployment, having no influence to the essence of the disclosure. The service deployment and management function entity and/or the AAA server collect/collects relevant information of the VN which includes one or more of the following information: the number of the PCs/VMs actually connected within the VN, the starting time and the end time of the connection of the PCs/VMs or the duration of the connection.

Step 302: The PC/VM automatically discovers the VN-AP, and after the PC/VM passes the VN's identity authentication, the automatically discovered VN-AP generates VN forwarding table entry of the PC/VM and performs tunnel encapsulation according to the VN forwarding table entry to forward a packet from the PC/VM.

The automatic discovery of the VN-AP by the PC/VM is as follows: the PC/VM sends a VN-AP discovery message via an Ethernet frame of a specific type; all the VN-APs in the broadcast domain of the PC/VM return VN-AP offer messages to the PC/VM; the PC/VM selects one VN-AP from all the VN-APs which returned the VN-AP offer messages and sends a VN-AP request message to the selected VN-AP; and the selected VN-AP returns an acknowledgement/response message to the PC/VM. The acknowledgement/response message includes VLAN identifier information or session identifier information used by the VN-AP and the PC/VM to separate the PC/VM from other PCs/VMs.

The PC/VM passing the VN's identity authentication refers to that the VN's identify of the PC/VM is authenticated through PPPoE or 802.1x protocol, and after the PC/VM passes the VN's identity authentication, the AAA server or the service deployment and management function entity returns a VN-ID to the VN-AP.

The generation of the VN forwarding table entry of the PC/VM by the automatically discovered VN-AP is as follows: when the PC/VM is the first VN access point in the broadcast domain or the information of the VN is absent in the VN-AP, the VN-AP generates the VN forwarding table and the VN forwarding table entry corresponding to the PC/VM, otherwise, the VN-AP generates the VN forwarding table entry of the PC/VM of the VN forwarding table.

Performing tunnel encapsulation refers to performing tunnel encapsulation using one or more message headers including VN-ID information.

It should be appreciated that the method may further include that the VN-AP performs information interaction with all other VN-APs of the VN in the data center network and/or the broadband network to synchronize the VN forwarding tables, wherein synchronizing the VN forwarding tables refers to synchronizing VN forwarding tables of all VN-APs of the VN through MP-BGP or extended MP-BGP or the learning mechanism of a data plane; and the user of the VN is charged according to the resource usage information of the VN which includes the number of the PCs/VMs actually connected within the VN, the duration of the connection and a charging strategy.

Figure 4:
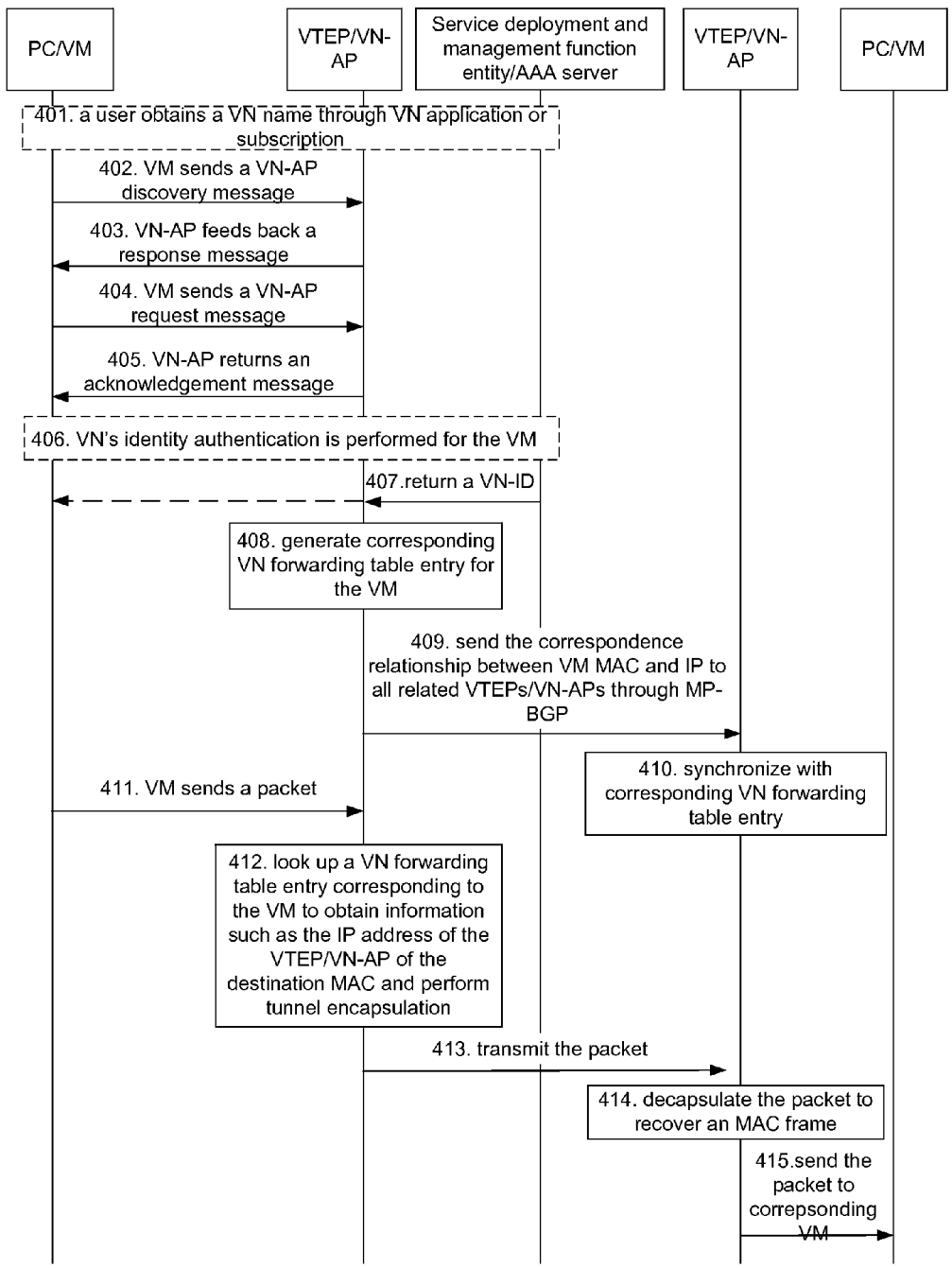
FIG. 4 is a flowchart schematically illustrating a method of realizing a VN according to a specific embodiment of the disclosure.

FIG. 4 shows the flow of a specific embodiment of the virtual network realization method provided herein, and as shown in FIG. 4, the specific embodiment includes the following steps.

Step 401: A user obtains a basic VN name through VN application or subscription.

Here, the basic VN name may be obtained by making an internal announcement in a company or from a related internal department of a company or from the website of a service provider. Certainly, a subscription process should be conducted between the user and the service provider, and the user may apply for a VN on a service deployment portal on the Internet or subscribes to a VN at a branch of the service provider.

Step 402: The VM sends a VN-AP discovery message via an Ethernet/L2 broadcast frame of a specific type and discovers a VTEP/VN-AP for processing the VN.

Step 403: All the VTEPs/VN-APs in a broadcast domain feed back a response message or a VN-AP response message.

Here, to deploy the service in an L2 broadcast domain, at least one VTEP/VN-AP should be set in each related L2 broadcast domain. From the point of view of practicability, if only one VTEP/VN-AP is set, then the invalidity of the VTEP/VN-AP may disable the deployment of the service, thus, a high-availability design may be needed here.

Steps 404-405: The VM selects one VTEP/VN-AP from a plurality of responses as a VM serving agent. The VM sends a VN-AP request message to the selected VTEP/VN-AP, receives an acknowledgement/response message from the selected VTEP/VN-AP and confirms that the VTEP/VN-AP is the VTEP/VN-AP required to process the VN.

Specifically, when the VTEP/VN-AP includes both a Hypervisor and an access switch, the access switch, prior to the Hypervisor, is selected to conduct a processing, because of its more processing capabilities; also the processing surely can be conducted using a dedicated device. A related selection strategy is determined mainly according to a service requirement and the processing capability of the VN-AP.

Step 406: The VTEP/VN-AP initiates a VN's identity authentication on the VM;

specifically, existing PPPoE or 802.1x authentication mechanism may be used. Specifically, an AAA server may store the preset VN feature information, including the VN name, the VN-ID, the possible number of the VLANs of the user, and further the bandwidth of the access interface to be used.

Step 407: After the VM passes the VN's identity authentication, the VTEP/VN-AP acquires the VN-ID, the possible VLAN ID of the VM and other information;

optionally, the VTEP/VN-AP transmits the VLAN information of the VM to the VM.

Step 408: The VTEP/VN-AP generates corresponding VN forwarding table entry;

the VN forwarding table entry includes the MAC address information of the VM, VLAN information and corresponding interface information.

Step 409: The VTEP/VN-AP forwards VM access/forwarding information to other VTEPs/VN-APs in the VN by using a mechanism such as MP-BGP; the VM access information generally refers to the MAC address information of the VM which may be set or obtained through automatic learning.

Step 410: The other VTEPs/VN-APs in the VN synchronize with the corresponding VN forwarding table entry.

Step 411: The VM uses the VLAN to encapsulate a packet and forwards the encapsulated packet to the VTEP/VN-AP.

Step 412-Step 413: The VTEP/VN-AP performs VN encapsulation and forwards the packet.

Specifically, the VN forwarding table entry corresponding to the VM is found to obtain information such as the IP address of the VTEP/VN-AP of the destination MAC, and tunnel encapsulation is performed and the packet is forwarded.

Possible encapsulation at least includes MAC layer encapsulation on an internal layer, VN layer encapsulation, IP layer encapsulation to the correspondent VTEP/VN-AP and further possible MAC layer encapsulation on an external layer, so that the related packet can be forwarded through an L2 network.

Step 414: After receiving the related packet, the correspondent VTEP/VN-AP decapsulates the packet.

Step 415: The VTEP/VN-AP forwards the packet of the MAC layer to the correspondent VM, thereby realizing communication.

The transmission flow of the information returned from the correspondent VM is similar to the foregoing steps and is therefore not described here repeatedly.

It should be appreciated that the VM may also be a PC and that the foregoing specific embodiment is described by taking a data center network as an example. Actually, a broadband network is structurally similar to a data center network, also having L2 access and L3 network. Thus, the steps above may be merely executed to deploy a VN in a broadband network; moreover, the VN may cross a broadband network and a data center network as long as the both networks are connected with each other on an IP layer, that is, an L3 layer. It should be further noted the service deployment and management function entity can be deployed in a data center network when a service is merely deployed in the data center network; and generally, the service deployment and management function entity is deployed in the network of a service provider, which is a broadband network, to provide support to the offer of a VN service in a data center and a broadband network simultaneously. As to the relationship between the service deployment and management function entity and the AAA server, as the AAA server is usually an independent entity which has been deployed in a broadband network already, the deployment of a VN service can be implemented by extending the AAA server or by increasing functional supports for the deployment of a VN service. In this case, the service deployment and management function entity needs to interact with the AAA server to deploy the VN service. For example, the registration information of a VN service is generally stored in the service deployment and management function entity while specific detailed service information, for example, the number of the VMs actually connected with the VN, is stored in the AAA server.

Figure 5:
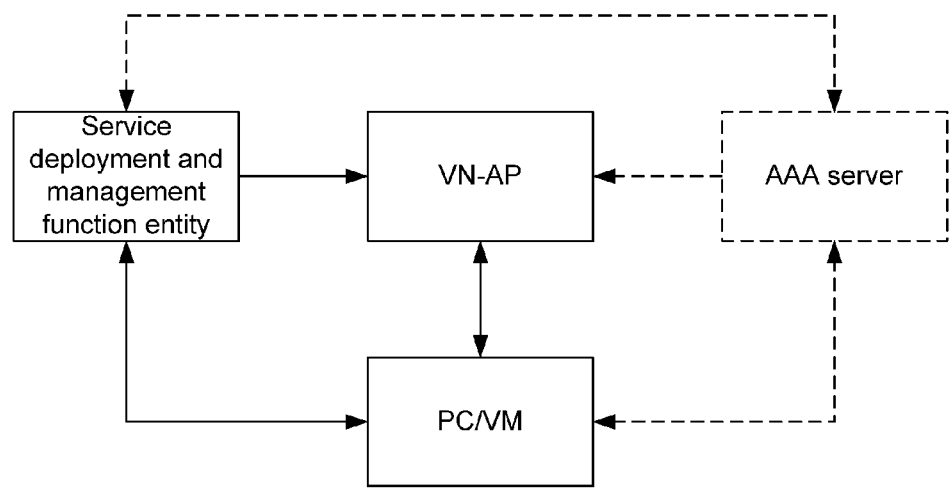
FIG. 5 is a schematic diagram illustrating the structure of a system for realizing the VN according to the disclosure.

FIG. 5 shows the structure of a virtual network realization system provided herein, and as shown in FIG. 5, the system includes a service deployment and management function entity, a PC/VM and a VN-AP, wherein the service deployment and management function entity receives a VN service request from a user to generate feature information of the VN;

AVN-AP is set in a data center network and/or a broadband network;

the PC/VM automatically discovers the VN-AP which is set in the data center network and/or the broadband network or is connected with the VN according to presetting of the VN-AP;

the VN-AP initiates a VN's identity authentication on the PC/VM after being discovered by the PC/VM automatically, generates a VN forwarding table entry of the PC/VM after the PC/VM passes the VN's identity authentication and performs tunnel encapsulation according to the VN forwarding table entry to forward a packet from the PC/VM.

Specifically, the PC/VM sends a VN-AP discovery message via an Ethernet frame of a specific type to a VN-AP in the broadcast domain where the PC/VM itself is located and selects one VN-AP according to the returned VN-AP offer message to send a VN-AP request message to the selected VN-AP.

Specifically, the VN-AP returns a VN-AP offer message to the PC/VM and returns an acknowledgement/response message to the PC/VM after receiving the VN-AP request message.

Specifically, the VN's identity of the PC/VM is authenticated through PPPoE or 802.1x protocols, and after PC/VM passed the authentication, a VN-ID is returned to the VN-AP.

The service deployment and management function entity and/or the AAA server collect/collects relevant information of the VN which includes one or more of the following information: the number of the PCs/VMs actually connected within the VN, the starting time and the end time of the connection of the PCs/VMs or the duration of the connection.

When the PC/VM is the first VN access point in the broadcast domain or the information of the VN is absent in the VN-AP, the VN-AP generates the VN forwarding table and the entry of the VN forwarding table, otherwise, the VN-AP generates the VN forwarding table entry of the PC/VM of the VN forwarding table.

Further, the VN-AP also performs information interaction with all other VN-APs of the VN in the data center network and/or the broadband network to synchronize the VN forwarding tables.

Specifically, the VN-AP synchronizes VN forwarding tables of all VN-APs of the VN through MP-BGP or extended MP-BGP or the learning mechanism of a data plane.

Specifically, the VN-AP performs tunnel encapsulation using one or more message headers including VN-ID information.

Further, the service deployment and management function entity or the AAA server charges the user of the VN according to the resource usage information of the VN which includes the number of the PCs/VMs actually connected within the VN, the duration of the connection and a charging strategy.

It should be appreciated that in the VN realization system above, (Internet) network connection is realized through a VN while a specific machine involved in the network, for example, a PC/VM, can be prepared by the user of the VN, especially, in the application scenario of a data center network, a PC/VM is generally provided by a service provider.

Figure 6:
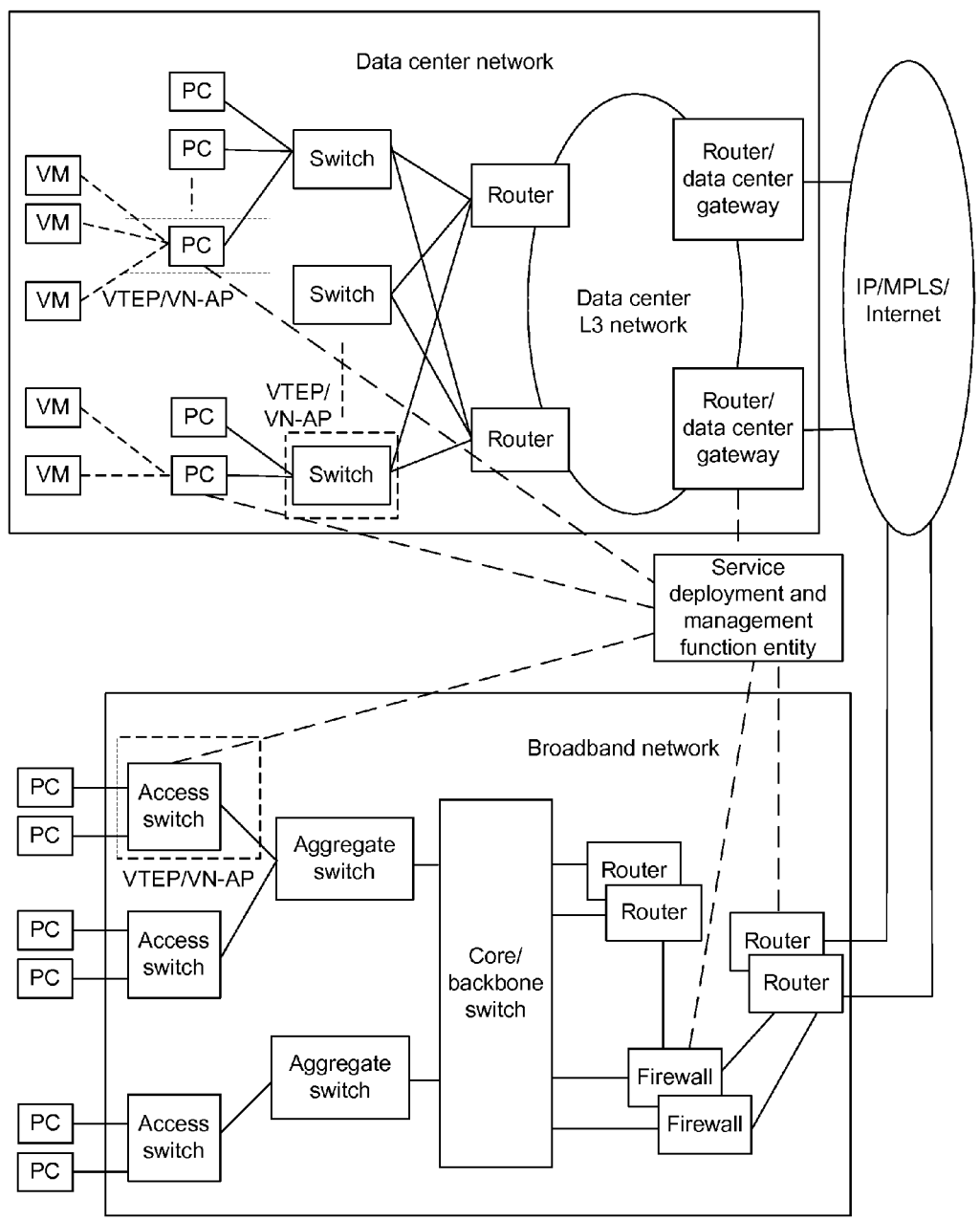
FIG. 6 is a schematic diagram illustrating a network structure using the system for realizing the VN according to the disclosure.

The network structure of the foregoing system is described below in FIG. 6, and as shown in FIG. 6, the network includes a data center network and a broadband network which intercommunicate with each other through an IP/MPLS/Internetworking network (INTERNET). Generally, the two networks may intercommunicate with each other on an IP layer, that is, the two networks are capable of realizing the various applications of existing INTERNET. A service deployment and management function entity is included in the network to support the implementation of a network-as-a-service function.

Embodiment of Automatic Realization of VN

A client may sign a network contract to register a VN service from a service (Network-as-a-Service) provider, the VN service specifically including a VN name, a possible VLAN number, a coverage range and so on. Specifically, the VN service may be applied on a service portal of the service provider. The service portal further generates a corresponding VN-ID based on related information and provides the generated VN-ID to the service deployment and management function entity.

Embodiment of Realization of Network-as-a-Service Accessed by Client Machine

The technology used in the embodiment of the automatic realization of a VN may be extended to an environment different from a data center network, that is, the function of Network-as-a-Service can also be automatically realized in the conventional broadband network environment.

Specifically, as shown in FIG. 6, the VTEP/VN-AP may be the conventional access switch in a broadband network. Different from in a data center network environment, the device connecting to the VN is not a VM but an independent physical PC of a client. The VN may be realized in a similar way as in a data center network, that is, the automatic access to the virtual network/NaaS and the functions of the virtual network/NaaS are realized in the conventional broadband network through overlay tunnel technology.

Embodiment of the Charging for NaaS

One of the main parts of the deployment of NaaS is charging for the generated VN. Definitely, the conventional strategy of monthly or yearly payment with flat rate may be adopted. However, as significant changes are caused for the support to the dynamic joining of a PC/VM in the disclosure, an on-demand charging method is needed to measure the resource utilization of a VN accurately to charge rationally. On the other hand, the revenue of the service provider is guaranteed while the misuse of network resources by a VN client is limited.

Specifically, the service deployment and management function entity charges the user of the VN according to the resource usage information of the VN which includes the number of the PCs/VMs actually connected within the VN, the duration of the connection and a charging strategy.

The resource usage information of the VN may be collected by the service deployment and management function entity or an AAA server which may be obtained by upgrading an existing AAA server.

To sum up, the virtual network realization method and system provided herein can deploy a virtual network rapidly at a reduced cost with the increased revenue of the service provider, and from the point of view of the user, because of the new service offer mode, both the network construction cost and the network utilization cost are reduced, and even the overall network security is improved. Moreover, the informationization of an enterprise can be supported, the IT expense of the enterprise is further reduced, and the utilization of network resources can be effectively optimized.

The mentioned above is merely preferred embodiments of the disclosure but is not to be construed as limitation to the protection scope of the disclosure.

What is claimed is:

1. A method for realizing a Virtual Network (VN), comprising:
setting a plurality of virtual network access points (VN-APs) in a data center network, wherein some of the VN-APs are physical switches connecting a plurality of Personal Computers (PCs), wherein some of the VN-APs are virtual switches hosted by Personal Computers (PCs) connecting a plurality of Virtual Machines (VMs), and wherein each VN-AP in the plurality of VN-APs comprises a forwarding table for routing packets;
receiving, by a service deployment and management function entity, a VN service request from a user to generate feature information of the VN, wherein the feature information of the VN includes the following information: a VN name, VN-ID of the VN, a MAC address of a PC in the PCs or a VM in the VMs (PC/VM) which can be connected with the VN, and a user name and a user password for authenticating VN's identity of the PC/VM;
automatically discovering a VN-AP in the plurality of VN-APs by the PC/VM; and
generating, by the automatically discovered VN-AP, a VN forwarding table entry of the PC/VM after the PC/VM passes VN's identity authentication, and performing tunnel encapsulation according to the VN forwarding table entry to forward a packet from the PC/VM,
wherein the automatic discovery of the VN-AP by the PC/VM is:
the PC/VM sends a VN-AP discovery message via an Ethernet frame of a specific type;
all VN-APs in the plurality of VN-APs that are in a broadcast domain of the PC/VM return VN-AP provision messages to the PC/VM;
the PC/VM selects one VN-AP from all the VN-APs which returned the VN-AP provision messages and sends a VN-AP request message to the selected VN-AP; and
the selected VN-AP returns an acknowledgement/response message to the PC/VM, wherein the acknowledgement/response message includes VLAN identifier information or session identifier information used by the VN-AP and the PC/VM to separate the PC/VM from other PCs/VMs;
wherein identity authentication comprises authenticating the identity of the PC/VM through Point to Point Protocol over Ethernet (PPPoE) or 802.1x protocol, and wherein after the PC/VM passes the identity authentication, an AAA server or the service deployment and management function entity returns a VN-ID to the discovered VN-AP;
synchronizing the VN forwarding tables of all VN-APs of the VN through MP-BGP or extended MP-BGP, or a learning mechanism of a data plane.

2. The method according to claim 1, wherein the acknowledgement/response message includes VLAN identifier information or session identifier information used by the VN-AP and the PC/VM to separate the PC/VM from other PCs/VMs.

3. The method according to claim 1, wherein the method further comprises:
storing the feature information of the VN in the service deployment and management function entity and/or an Authenticating, Authorizing and Accounting (AAA) server.

4. The method according to claim 3, further comprising:
collecting, by the service deployment and management function entity and/or the AAA server, relevant information of the VN which includes one or more of following information: the number of PCs/VMs actually connected within the VN, starting time and ending time of the connection of the PCs/VMs or duration of the connection.

5. The method according to claim 1, wherein the generation of the VN forwarding table entry of the PC/VM by the automatically discovered VN-AP is:
when the PC/VM is a first VN access point in a broadcast domain or information of the VN is absent in the VN-AP, a VN forwarding table and the VN forwarding table entry are generated, otherwise, the VN forwarding table entry of the PC/VM of the VN forwarding table is generated.

6. The method according to claim 5, further comprising:
performing, by the VN-AP, information interaction with all other VN-APs of the VN in the data center network to synchronize the VN forwarding table.

7. The method according to claim 1, wherein performing tunnel encapsulation refers to:
performing the tunnel encapsulation using one or more message headers including VN-ID information.

8. The method according to claim 1, further comprising:
charging the user of the VN according to resource usage information of the VN, wherein the resource usage information of the VN includes the number of PCs/VMs actually connected within the VN, duration of the connection and a charging strategy.

9. A system for realizing a virtual network (VN), comprising a service deployment and management function entity and a plurality of virtual network access points (VN-APs), wherein some of the VN-APs are physical switches connecting a plurality of Personal Computers (PCs), wherein some of the VN-APs are virtual switches hosted by Personal Computers (PCs) connecting a plurality of Virtual Machines (VMs), and wherein each VN-AP in the plurality of VN-APs comprises a forwarding table for routing packets, wherein:
the service deployment and management function entity is configured to receive a VN service request from a user to generate feature information of the VN, wherein the feature information of the VN includes the following information: a VN name, VN-ID of the VN, a MAC address of a PC in the PCs or a VM in the VMs (PC/VM) which can be connected with the VN, and a user name and a user password for authenticating VN's identity of the PC/VM;
the PC/VM is configured to automatically discover a VN-AP in the plurality of VN-APs which is set in the data center network, wherein the automatic discovery of the VN-AP by the PC/VM comprises:
the PC/VM is configured to send a VN-AP discovery message via an Ethernet frame of a specific type;
all VN-APs in the plurality of VN-APs that are in a broadcast domain of the PC/VM are configured to return VN-AP provision messages to the PC/VM;
the PC/VM is configured to select one VN-AP from all the VN-APs which returned the VN-AP provision messages and configured to send a VN-AP request message to the selected VN-AP; and
the selected VN-AP is configured to return an acknowledgement/response message to the PC/VM, wherein the acknowledgement/response message includes VLAN identifier information or session identifier information used by the VN-AP and the PC/VM to separate the PC/VM from other PCs/VMs; and
the VN-AP is configured to support to authenticate VN's identity of the PC/VM, generate a VN forwarding table entry of the PC/VM after the PC/VM passed the VN's identity authentication, and perform tunnel encapsulation according to the VN forwarding table entry to forward a packet from the PC/VM, wherein identity authentication comprises authenticating the identity of the PC/VM through Point to Point Protocol over Ethernet (PPPoE) or 802.1x protocol, and wherein after the PC/VM passes the identity authentication, an AAA server or the service deployment and management function entity returns a VN-ID to the discovered VN-AP.

10. The system according to claim 9, wherein the service deployment and management function entity or the AAA server is also configured to collect relevant information of the VN which includes one or more of following information: the number of PCs/VMs actually connected within the VN, starting time and ending time of the connection of the PCs/VMs or duration of the connection.

11. The system according to claim 9, wherein when the PC/VM is a first VN access point in a broadcast domain or information of the VN is absent in the VN-AP, the VN-AP generates a VN forwarding table and the VN forwarding table entry, otherwise, the VN-AP generates the VN forwarding table entry of the PC/VM of the VN forwarding table.

12. The system according to claim 11, wherein the VN-AP is further configured to perform information interaction with all other VN-APs of the VN in the data center network to synchronize VN forwarding tables.

13. The system according to claim 9, wherein the VN-AP performs the tunnel encapsulation using one or more message headers including VN-ID information.

14. The system according to claim 9, wherein the service deployment and management function entity or an AAA server is also configured to charge the user of the VN according to resource usage information of the VN, wherein the resource usage information of the VN includes the number of PCs/VMs actually connected within the VN, duration of the connection and a charging strategy.

* * * * *